US011723024B2

(12) United States Patent
Taherzadeh Boroujeni et al.

(10) Patent No.: US 11,723,024 B2
(45) Date of Patent: Aug. 8, 2023

(54) ALTERNATIVE SEMI-PERSISTENT SCHEDULING (SPS) PARAMETER IMPLEMENTATION TECHNIQUES

(71) Applicant: QUALCOMM Incorporated, San Diego, CA (US)

(72) Inventors: Mahmoud Taherzadeh Boroujeni, San Diego, CA (US); Tao Luo, San Diego, CA (US); Peter Gaal, San Diego, CA (US); Juan Montojo, San Diego, CA (US); Jing Sun, San Diego, CA (US); Iyab Issam Sakhnini, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/315,525

(22) Filed: May 10, 2021

(65) Prior Publication Data

US 2021/0360669 A1 Nov. 18, 2021

Related U.S. Application Data

(60) Provisional application No. 63/023,732, filed on May 12, 2020.

(51) Int. Cl.
*H04W 72/12* (2023.01)
*H04W 72/04* (2023.01)
(Continued)

(52) U.S. Cl.
CPC ... *H04W 72/1273* (2013.01); *H04W 72/0446* (2013.01); *H04W 72/121* (2013.01); *H04W 72/535* (2023.01)

(58) Field of Classification Search
CPC ......... H04W 72/0446; H04W 72/1273; H04W 72/1257; H04W 16/04; H04W 72/02; H04W 72/0493; H04W 36/06
See application file for complete search history.

(56) References Cited

U.S. PATENT DOCUMENTS

2017/0303302 A1* 10/2017 Bagheri ................. H04W 72/23
2019/0254067 A1* 8/2019 Al-Imari ............... H04L 1/1887
(Continued)

FOREIGN PATENT DOCUMENTS

WO WO-2020033660 A1 * 2/2020 ........... H04L 1/1812

OTHER PUBLICATIONS

VIVO:"UL Inter-UE Tx Prioritization for URLLC", 3GPP Draft, 3GPP TSG RAN WG1#97,R1-1906150_UL Inter UE TX Prioritization for URLLC, 3rd Generation Partnership Project(GPP), F-06921,Sophia-Antipolis Cedex, France,vol. RANWG1,No. Reno,USA, May 13, 2019-May 2019 (Year: 2019).*

*Primary Examiner* — Romani Ohri
(74) *Attorney, Agent, or Firm* — Norton Rose Fulbright US LLP

(57) ABSTRACT

Techniques for alternative semi-persistent scheduling (SPS) parameter implementation in association with preemption of use of resources corresponding to other SPS parameters are described. Wireless devices may be implicitly informed with respect to implementing alternative resources corresponding to one or more alternative SPS parameters when use of resources corresponding to first SPS parameters is preempted. A disruption indication (DI), such as used to indicate preemption of downlink transmission on downlink SPS allocated resources and/or a cancellation indication of uplink transmission on uplink SPS allocated resources, may be used to inform (e.g., implicitly) one or more wireless devices to employ alternative resources corresponding to alternative (Continued)

SPS parameters available to the wireless devices. Other aspects and features are also claimed and described.

28 Claims, 5 Drawing Sheets

(51) Int. Cl.
  *H04W 72/1273* (2023.01)
  *H04W 72/0446* (2023.01)
  *H04W 72/121* (2023.01)
  *H04W 72/50* (2023.01)

(56) References Cited

U.S. PATENT DOCUMENTS

2020/0128557 A1* 4/2020 Suzuki ............... H04L 27/0006
2022/0217736 A1* 7/2022 Taherzadeh Boroujeni ...............
                                                    H04W 72/1263

\* cited by examiner

ALTERNATIVE SEMI-PERSISTENT SCHEDULING (SPS) PARAMETER IMPLEMENTATION TECHNIQUES

CROSS-REFERENCE TO RELATED APPLICATIONS

This application claims the benefit of U.S. Provisional Patent Application No. 63/023,732, entitled, "ALTERNATIVE SEMI-PERSISTENT SCHEDULING (SPS) PARAMETER IMPLEMENTATION TECHNIQUES," filed on May 12, 2020 the disclosure of which is expressly incorporated by reference herein in its entirety.

TECHNICAL FIELD

Aspects of the present disclosure relate generally to wireless communication systems, and more particularly, to implementing alternative resources for semi-persistent scheduling (SPS). Certain embodiments of the technology discussed below can enable and provide alternative SPS parameter implementation in association with disruption of allocation of resources, such as preemption or cancellation of use of resources, corresponding to other SPS parameters.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

In a congested network, for example, downlink transmission on a set of time and frequency resources may be preempted, such as in order to utilize those time and frequency resources for ultra-reliable low-latency communication (URLLC). A preemption indication (PI) has been proposed to indicate such preemption of the downlink transmission on a set of time and frequency resources to UEs.

BRIEF SUMMARY OF SOME EMBODIMENTS

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication is provided. The method may include determining, by a base station, to disrupt use of resources corresponding to first semi-persistent scheduling (SPS) parameters with respect to one or more user equipments (UEs) in communication with the base station. The method may further include indicating, by the base station to the one or more UEs, implementation of alternative resources corresponding to one or more alternative SPS parameters for utilization by the one or more UEs based at least in part on a disruption indication (DI) transmitted by the base station to the one or more UEs.

In an additional aspect of the disclosure, an apparatus configured for wireless communication is provided. The apparatus may include means for determining, by a base station, to disrupt use of resources corresponding to first SPS parameters with respect to one or more UEs in communication with the base station. The apparatus may further include means for indicating, by the base station to the one or more UEs, implementation of alternative resources corresponding to one or more alternative SPS parameters for utilization by the one or more UEs based at least in part on a DI transmitted by the base station to the one or more UEs.

In an additional aspect of the disclosure, a non-transitory computer-readable medium having program code recorded thereon for wireless communication is provided. The program code may include code to determine, by a base station, to disrupt use of resources corresponding to first SPS parameters with respect to one or more UEs in communication with the base station. The program code may further include code to indicate, by the base station to the one or more UEs, implementation of alternative resources corresponding to one or more alternative SPS parameters for utilization by the one or more UEs based at least in part on a DI transmitted by the base station to the one or more UEs.

In an additional aspect of the disclosure, an apparatus configured for wireless communication is provided. The apparatus includes at least one processor, and a memory coupled to the processor. The processor may be configured to determine, by a base station, to disrupt use of resources corresponding to first SPS parameters with respect to one or more UEs in communication with the base station. The processor may further be configured to indicate, by the base station to the one or more UEs, implementation of alternative resources corresponding to one or more alternative SPS parameters for utilization by the one or more UEs based at least in part on a DI transmitted by the base station to the one or more UEs.

In accordance with aspects of the disclosure, the foregoing systems, methods, and apparatuses may be implemented in combination with one or more additional features, such as the following features whether alone or in combination. For example, the above systems, methods, and apparatuses may include the DI indicating preemption of downlink transmission on a set of time and frequency resources. The above systems, methods, and apparatuses may include the preemption of downlink transmission on the set of resources being for usage of the set of time and frequency resources by the base station for downlink ultra-reliable low-latency communication (URLLC) transmission. The above systems, methods, and apparatuses may include the one or more alternative SPS parameters including an alternative SPS parameter configuration stored by a respective UE of the one or more UEs in addition to a first SPS parameter configuration used by the respective UE as the first SPS parameters. The above systems, methods, and apparatuses may include indicating the alternative SPS parameter configuration in a radio resource control (RRC) configuration of a search space associated with group common-downlink control information (GC-DCI) that includes the PI. The above systems, methods, and apparatuses may include the PI indicating that the respective UE is to select the alternative SPS parameter configuration based upon a next SPS parameter configuration of an ordered list of SPS parameter configurations stored by the respective UE. The above systems, methods, and apparatuses may include the one or more alternative SPS parameters including changed one or more parameters of the first SPS parameters. The above systems, methods, and apparatuses may include the changed one or more parameters of the first SPS parameters including a secondary set of SPS parameters included with the first SPS parameters when a UE of the one or more UEs was configured with the first SPS parameters. The above systems, methods, and apparatuses may include a duration of the implementation of the alternative resources corresponding to the one or more alternative SPS parameters being based at least in part on a timing of the DI, a time resource of the first SPS parameters indicated by the DI as being interrupted by preemption, or a combination thereof. The above systems, methods, and apparatuses may include a duration of the implementation of the alternative resources corresponding to the one or more alternative SPS parameters being based at least in part on an alternative SPS time value stored by a respective UE of the one or more UEs. The above systems, methods, and apparatuses may include the implementation of the alternative resources corresponding to the one or more alternative SPS parameters being based at least in part on a length of preemption of the first SPS parameters, an amount of time implementation of SPS parameters of the one or more alternative SPS parameters would overlap a first SPS parameter configuration, or a combination thereof. The above systems, methods, and apparatuses may include the implementation of the alternative resources corresponding to the one or more alternative SPS parameters being based at least in part on content of the DI. The above systems, methods, and apparatuses may include SPS parameters of the one or more alternative SPS parameters being selected based at least in part on a time resource, a frequency resource, or an antenna beam included in the DI. The above systems, methods, and apparatuses may include the one or more alternative SPS parameters including a first alternative SPS parameter configuration implemented by a first UE of the one or more UEs and a second alternative SPS parameter configuration implemented by a second UE of the one or more UEs, wherein the first SPS parameter configuration is different than the second SPS parameter configuration. The above systems, methods, and apparatuses may include the one or more UEs including UEs implementing enhanced mobile broadband (eMBB) communications, and wherein the one or more alternative SPS parameters are configured to mitigate degradation of at least one of reliability or coverage of the eMBB communications.

In one aspect of the disclosure, a method of wireless communication is provided. The method may include receiving, by a UE, a DI transmitted by a base station to one or more UEs to disrupt use of resources corresponding to first SPS parameters with respect to the one or more UEs. The method may further include implementing, by the UE, alterative resources corresponding to one or more alternative SPS parameters for utilization based at least in part on the DI received from the base station.

In an additional aspect of the disclosure, an apparatus configured for wireless communication is provided. The apparatus may include means for receiving, by a UE, a DI transmitted by a base station to one or more UEs to disrupt use of resources corresponding to first SPS parameters with respect to the one or more UEs. The apparatus may further include means for implementing, by the UE, alterative resources corresponding to one or more alternative SPS parameters for utilization based at least in part on the DI received from the base station.

In an additional aspect of the disclosure, a non-transitory computer-readable medium having program code recorded thereon for wireless communication is provided. The program code may include code to receive, by a UE, a DI transmitted by a base station to one or more UEs to disrupt use of resources corresponding to first SPS parameters with respect to the one or more UEs. The program code may further include code to implement, by the UE, alterative resources corresponding to one or more alternative SPS parameters for utilization based at least in part on the DI received from the base station.

In an additional aspect of the disclosure, an apparatus configured for wireless communication is provided. The apparatus includes at least one processor, and a memory coupled to the processor. The processor may be configured to receive, by a UE, a DI transmitted by a base station to one or more UEs to disrupt use of resources corresponding to first SPS parameters with respect to the one or more UEs. The processor may be further configured to implement, by the UE, alterative resources corresponding to one or more alternative SPS parameters for utilization based at least in part on the DI received from the base station.

In accordance with aspects of the disclosure, the foregoing systems, methods, and apparatuses may be implemented in combination with one or more additional features, such as the following features whether alone or in combination. For example, the above systems, methods, and apparatuses may include the DI indicating preemption of downlink transmission to the UE on a set of time and frequency resources. The above systems, methods, and apparatuses may include the preemption of downlink transmission to the UE on the set of resources being for usage of the set of resources by the base station for downlink URLLC transmission. The above systems, methods, and apparatuses may include the one or more alternative SPS parameters including an alternative SPS parameter configuration stored by the UE in addition to a first SPS parameter configuration used by the respective UE as the first SPS parameters. The above systems, methods, and apparatuses may include determining the alternative SPS parameter configuration from a RRC configuration of a search space associated with GC-DCI that includes the DI. The above systems, methods, and apparatuses may include the DI indicating that the UE is to select the alternative SPS parameter configuration based upon a next SPS parameter configuration of an ordered list of SPS parameter configurations stored by the respective UE. The above systems, methods, and apparatuses may include the one or more alternative SPS parameters including changed one or more parameters of the first SPS parameters. The above systems, methods, and apparatuses may include the changed one or more parameters of the first SPS parameters including a secondary set of SPS parameters obtained with the first SPS parameters when the UE was configured with the first SPS parameters. The above systems, methods, and apparatuses may include a duration of the implementing the alternative resources corresponding to the one or more alternative SPS parameters being based at least in part on a timing of the DI, a time resource of the first SPS parameters indicated by the DI as being interrupted by disruption, or a combination thereof. The above systems, methods, and apparatuses may include a duration of the implementing the alternative resources corresponding to the one or more alternative SPS parameters being based at least in part on an alternative SPS time value stored by a respective UE of the one or more UEs. The above systems, methods, and apparatuses may include the implementing the alternative resources corresponding to the one or more alternative SPS parameters being based at least in part on a length of disruption of the first SPS parameters, an amount of time implementation of SPS parameters of the one or more alternative SPS parameters would overlap a first SPS parameter configuration, or a combination thereof. The above systems, methods, and apparatuses may include the implementing the alternative resources corresponding to the one or more alternative SPS parameters being based at least in part on content of the DI. The above systems, methods, and apparatuses may include SPS parameters of the one or more alternative SPS parameters being selected based at least in part on a time resource, a frequency resource, or an antenna beam included in the DI. The above systems, methods, and apparatuses may include the one or more alternative SPS parameters including a first alternative SPS parameter configuration implemented by the UE and a second alternative SPS parameter configuration implemented by another UE of the one or more UEs, wherein the first SPS parameter configuration is different than the second SPS parameter configuration. The above systems, methods, and apparatuses may include the UE implementing eMBB communications, and wherein the one or more alternative SPS parameters are configured to mitigate degradation of at least one of reliability or coverage of the eMBB communications.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
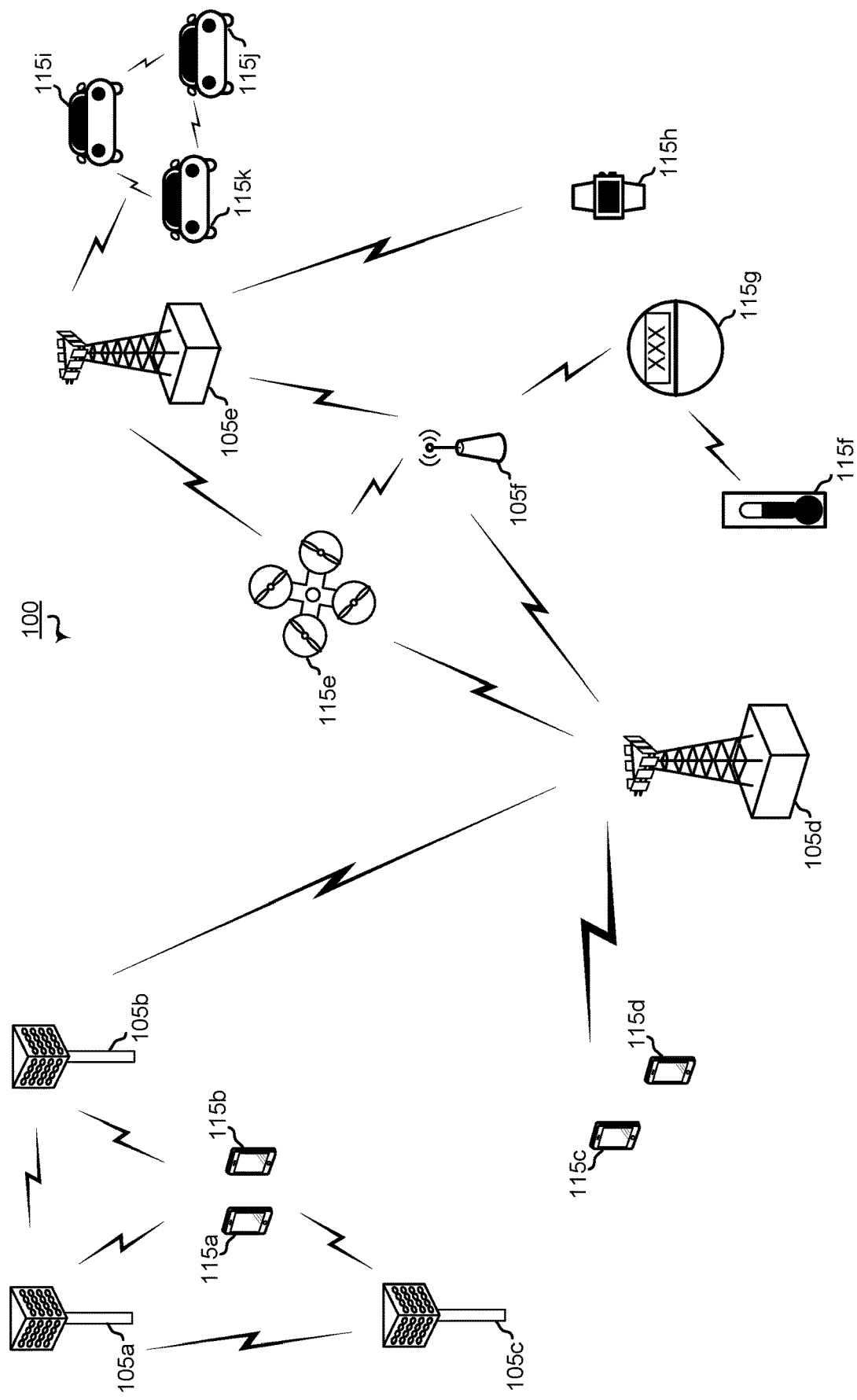
FIG. 1 is a block diagram illustrating details of a wireless communication system according to some embodiments of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "$3^{rd}$ Generation Partnership Project" (3GPP), and cdma2000 is described in documents from an organization named Generation Partnership Project 2" (3GPP2). These various radio technologies and standards are known or are being developed. For example, the $3^{rd}$ Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3$^{rd}$ Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
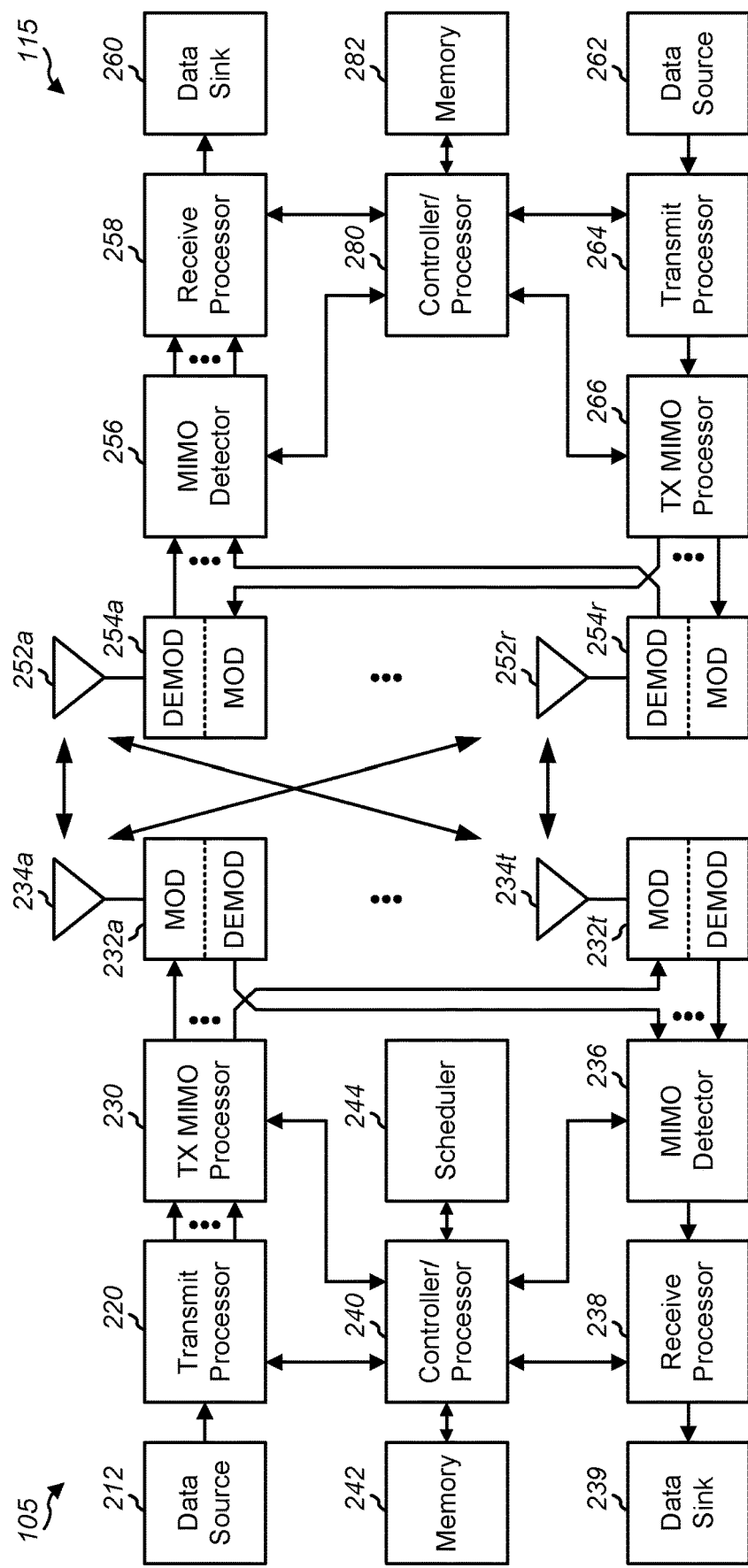
FIG. 2 is a block diagram conceptually illustrating a design of a base station and a UE configured according to some embodiments of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the physical downlink shared channel (PDSCH), etc. Transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 3 and 4, and/or other processes for the techniques described herein. Memories 242 and 282 may store data and program codes for base station 105 and UE 115, respectively. Scheduler 244 may schedule UEs for data transmission on the downlink and/or uplink.

In operation according to aspects of the disclosure, various resources (e.g., time and/or frequency resources, antenna beams, etc.) may be allocated for communications between wireless devices (e.g., base stations 105, UEs 115, etc.) of wireless network 100. For example, a base station 105 serving one or more UEs 115 may allocate resources for establishing and maintaining communication links between the base station and UEs being served. Resource allocations may, for example, be made with respect to various uplink channels (e.g., PUCCH, PUSCH, etc.) and/or downlink channels (e.g., PDCCH, PDSCH, etc.).

In accordance with some aspects, a base station may provide resource allocation information to UEs in communication therewith via one or more control channels. Resources may be allocated dynamically (e.g., using downlink control information (DCI) signaling), such as to accommodate rapidly conditions, traffic, etc. Additionally or alternatively, semi-persistent resource allocations may be made (e.g., using radio resource control (RRC) signaling), such as with respect to semi-persistent scheduling (SPS) of resources to facilitate channels (e.g., PUSCH, PDSCH, etc.) implemented for extended periods of time. "Semi-persistent" scheduling may, for example, be implemented for extended or relatively long periods of time (e.g., remaining applicable for periods of time extending minutes, hours, days, etc., until the occurrence of an event, etc.).

In a congested network, transmission using a set of allocated resources (e.g., time and/or frequency resources, one or more antenna beams, etc.) may be preempted to allow those resources to be used for other (e.g., higher priority) communications. For example, resources allocated for a downlink channel (e.g., PDSCH) using SPS may be preempted from time to time in order to utilize those resources for ultra-reliable low-latency communication (URLLC). Preemption of transmissions using a set of allocated resources may, however, reduce the reliability of communication with respect to the wireless devices (e.g., UEs) for which allocated resources have been preempted. Further, preemption of downlink transmission may also degrade the coverage with respect to a channel for which the use of allocated resources have been preempted. For example, resource preemption may drop some of the PDSCH repetitions for a UE, which may result in inadequate downlink coverage (e.g., reducing cell coverage with respect to UEs implementing enhanced mobile broadband (eMBB) communications).

In accordance with some aspects of the present disclosure, alternative resources may be provided for use when the use of allocated resources has been preempted. For example, one or more alternative SPS parameters may be utilized to configure alternative resources when it has been determined that allocated resources are preempted. As an example, it may be determined that downlink resources corresponding to first SPS parameters with respect to one or more UEs are to be preempted, and thus alternative downlink resources corresponding to one or more alternative SPS parameters are to be implemented by the one or more UEs. As another example, it may be determined that uplink resources corresponding to first SPS parameters with respect to one or more UEs are to be cancelled, and thus alternative uplink resources corresponding to one or more alternative SPS parameters are to be implemented for transmitting by the one or more UEs. The SPS parameters may, for example, identify one or more time and/or frequency resources, one or more antenna beams, etc. for use by a wireless device in establishing and/or maintaining a communication link. Different SPS parameter configurations may thus provide for differing time and/or frequency resources, antenna beams, etc. being used by the wireless device.

Signaling may be utilized to dynamically indicate implementation of alternative resources. Such signaling is, however, configured according to some aspects of the present disclosure to dynamically indicate implementation of alternative resources without introducing excessive signaling overhead.

According to some aspects, wireless devices may be implicitly informed with respect to implementing alternative resources corresponding to one or more alternative SPS parameters when use of resources corresponding to first SPS parameters is disrupted (e.g., preempted, cancelled, etc.). For example, a group of UEs may be implicitly informed to monitor alternative downlink resources when transmission on downlink resources allocated using SPS are preempted. Additionally or alternatively, a group of UEs may be implicitly informed to utilize alternative uplink resources when transmission on uplink resources allocated using SPS are cancelled.

A preemption indication (PI) may be used to indicate to one or more UEs the preemption of downlink transmission on downlink SPS allocated resources. In NR networks, for example, a PI is a group-common DCI (GC-DCI) that indicates preemption of the downlink transmission on a set of time and frequency resources. A cancellation indication (CI) may be used when a base station allocates resources scheduled for one or more UEs transmissions to another UE (e.g., because of a strict latency requirement) to ask the one or more UEs to stop their transmissions. In accordance with some aspects of the disclosure, a PI, CI, and/or other indication of disruption of allocation of resources (referred to collectively herein as disruption indications (DIs)) may be used to inform (e.g., implicitly) one or more UEs to utilize alternative resources corresponding to alternative SPS parameters available to the UEs.

In some examples, wireless devices may be preconfigured with various SPS parameters for use in implementing different resource configurations in establishing and/or maintaining communication links. For example, an ordered or indexed list of SPS parameter configurations may be provided to wireless devices (e.g., UEs 115), such as when being provisioned, upon joining a network, when establishing a connection with another wireless device (e.g., base stations 105), etc. A SPS parameter configuration (e.g., a "first" SPS parameter configuration) of the SPS parameter configurations stored by a UE may be utilized to identify resources utilized (e.g., for downlink monitoring and/or uplink transmission) by that UE for a channel (e.g., PDSCH and/or PUSCH). Another SPS parameter configuration (e.g., an "alternative" SPS parameter configuration) of the SPS parameter configurations stored by the UE may thereafter be utilized to identify resources utilized (e.g., for downlink monitoring and/or uplink transmission) by the UE for the channel upon disruption (e.g., preemption, cancellation, etc.) of transmission using the resources of the first SPS parameter configuration.

A DI (e.g., PI and/or CI) may be utilized in activating a preconfigured SPS parameter configuration according to some aspects of the disclosure. For example, an alternative SPS parameter configuration of SPS parameter configurations stored by a UE may be activated, based at least in part on a DI. In an example, a UE receiving a DI from a base station may activate an alternative SPS parameter configuration of SPS parameter configurations stored by a UE to identify resources utilized (e.g., for monitoring and/or transmitting signals) by the UE for a downlink and/or uplink channel, such as to mitigate or avoid degraded reliability and/or coverage due to disruption of transmission using the resources of a first SPS parameter configuration.

A particular alternative SPS parameter configuration for use by a UE may be indicated in a number of different ways using a DI according to concepts of the present disclosure. For example, a particular alternative SPS parameter configuration to be activated, from a plurality of SPS parameter configurations stored by a UE, may be indicated in the RRC configuration of the search space associated to the GC-DCI that carries the DI. Additionally or alternatively, a particular alternative SPS parameter configuration to be activated, from a plurality of SPS parameter configurations stored by a UE, may be selected based on an index designating the alternative SPS parameter configuration. In some examples, upon disruption (e.g., preemption, cancellation, etc.) of transmission using resources corresponding to a first SRS parameter configuration a next SPS parameter configuration (e.g., a SPS parameter configuration corresponding to a next incremental index value, a next SPS parameter of an ordered list of SPS parameter configurations, etc.) may be activated for resources corresponding to an alternative SPS parameters.

A DI (e.g., PI and/or CI) may be utilized in changing the parameters of an active SPS parameter configuration according to some aspects of the disclosure. For example, an alternative SPS parameter configuration may be implemented by changing one or more parameters (e.g., time and/or frequency resources, one or more antenna beams, etc.) of a first SPS parameter configuration, based at least in part on a DI. In an example, a UE receiving a PI from a base station may change one or more SPS parameters of the resources being preempted using one or more alternative SPS parameters available to a UE, such as to mitigate or avoid degraded reliability and/or coverage due to preemption of transmission using the resources of a first SPS parameter configuration. In another example, a UE receiving a CI from a base station may change one or more SPS parameters of the resources being cancelled using one or more alternative SPS parameters available to a UE, such as to mitigate or avoid degraded reliability and/or coverage due to cancellation of transmission using the resources of a first SPS parameter configuration.

A UE may be configured with alternative SPS parameters for use with respect to a SPS parameter configuration in a number of different ways. For example, configuration of a UE with a SPS parameter configuration for a particular channel, communication link, etc. may include a secondary set of SPS parameters (e.g. secondary time and/or frequency resources, one or more antenna beams, etc.), wherein the secondary set of SPS parameters may be activated at least in part by a DI. Such secondary SPS parameters may include SPS parameters for implementing multiple different alternative SPS parameter configurations. In accordance with some aspects of the disclosure, for example, secondary SPS parameters provided to a UE when configured with a SPS parameter configuration may include a plurality of indexed SPS parameters, an ordered list of SPS parameters, etc., one or more of which may be used as alternative SPS parameter configurations according to aspects of the present disclosure.

Activation of alternative SPS parameter configurations based upon a DI may be conditioned upon one or more additional considerations. In accordance with some aspects of the present disclosure, an alternative SPS parameter configuration may be implemented based at least in part on a DI indicating disruption (e.g., preemption, cancellation, etc.) of transmission using resources of a first SPS parameter configuration conditioned on the length or duration of the disruption, the amount of time implementation of SPS parameters of the one or more alternative SPS parameters would overlap a first SPS parameter configuration, etc., and combinations thereof. For example, preemption of transmission using downlink resources of a first SPS parameter configuration for a threshold period of time, as may be indicated in a PI, may activate a next alternative SPS parameter configuration. As another example, cancellation of transmission using uplink resources of a first SPS parameter configuration for a threshold period of time, as may be indicated in a CI, may activate a next alternative SPS parameter configuration.

The particular alternative SPS parameter configurations activated with respect to disruption of transmission using resources of a first SPS parameter configuration may be selected using various information, such as information regarding the particular time and/or frequency resources disrupted, a particular antenna beam disrupted, a timing of the disruption, a length or duration of disruption, etc. Implementation of alternative downlink resources corresponding to the one or more alternative SPS parameters may, for example, be based at least in part on content of the DI (e.g., information regarding disrupted resources, length of disruption, etc.).

A length or duration of implementation of resources of an alternative SPS parameter configuration may depend upon various factors. For example, a length or duration of activation of an alternative SPS parameter configuration may be based at least in part on the timing of a DI, the particular time resources of the first SPS parameter configuration that are disrupted (e.g., as may be indicated by the DI), etc., and combinations thereof. Additionally or alternatively, a length or duration of activation of an alternative SPS parameter configuration may be based at least in part on an alternative SPS time value stored by the UE (e.g., provided to the UE when being provisioned, upon joining a network, when establishing a connection with another wireless device, etc.).

Figures 3, 4:
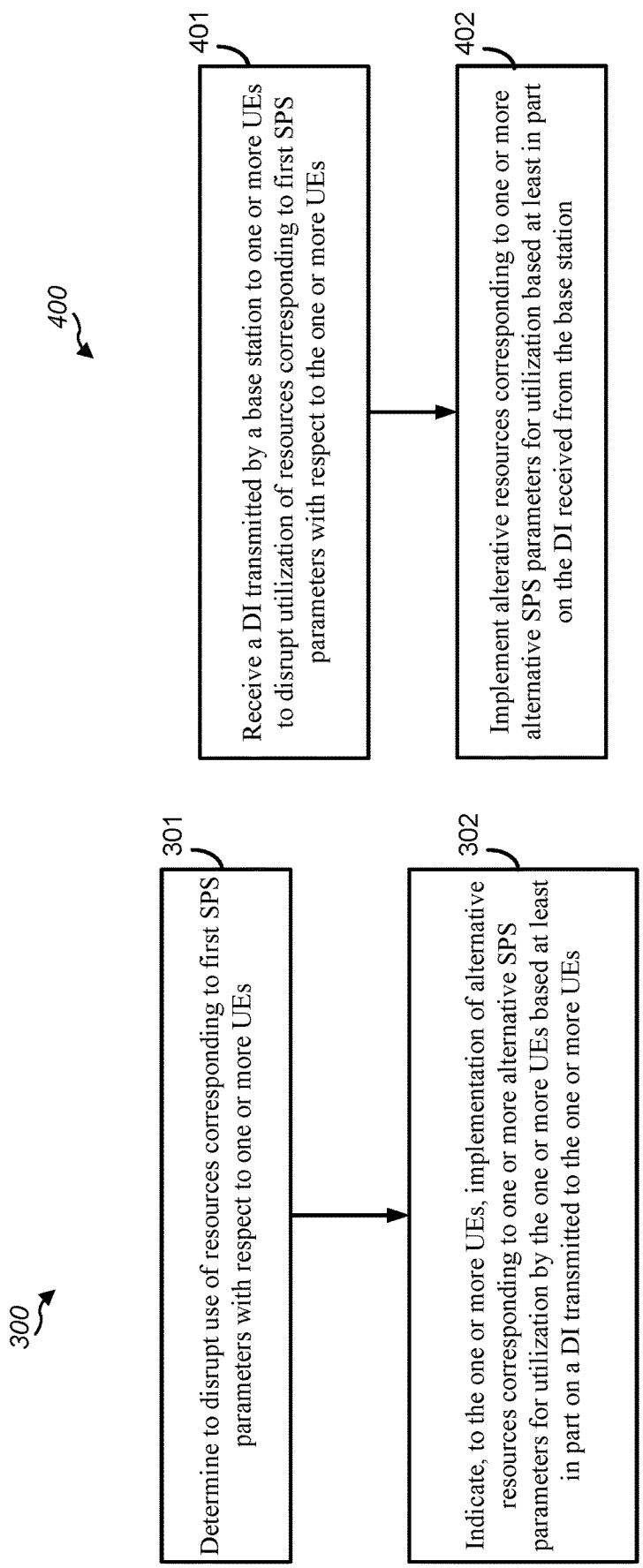
FIG. 3 is a block diagram illustrating example blocks executed by a base station performing an alternative semi-persistent scheduling (SPS) parameter implementation technique according to some aspects of the present disclosure.
FIG. 4 is a block diagram illustrating example blocks executed by a user equipment (UE) performing an alternative SPS parameter implementation technique according to some aspects of the present disclosure.

FIGS. 3 and 4 show example operations providing alternative SPS parameter implementation in accordance with some aspects of the present disclosure. In particular, FIG. 3 illustrates example blocks executed by a base station for facilitating alternative SPS parameter implementation in association with disruption of use of resources corresponding to first SPS parameters. FIG. 4 illustrates example blocks executed by a UE for facilitating alternative SPS parameter implementation in association with disruption of use of resources corresponding to first SPS parameters.

Referring first to FIG. 3, flow 300 of the illustrated example shows operation by a base station according to an alternative SPS parameter implementation technique of some aspects of the present disclosure. At block 301 of flow 300, a base station may determine to disrupt use of resources corresponding to first SPS parameters with respect to one or more UEs in communication with the base station. For example, a base station may determine to preempt use of downlink resources and/or cancel use of uplink resources) corresponding to first SPS parameters with respect to one or more UEs in communication with the base station. In accordance with some aspects of the disclosure, logic of base station 105 (e.g., alternative SPS parameter control code or instructions stored by memory 242 and executed by controller/processor 240) may analyze various aspects of communications served by the base station (e.g., quality of service (QoS) requirements, latency requirements, congestion, transmission buffer status, etc.) and determine that disruption of the use of one or more resources is to be initiated. It may be determined, for example, that the use of downlink resources (e.g., time and/or frequency resources, antenna beam resources, etc.) corresponding a first SPS parameter configuration allocated to the one or more UEs for a downlink channel (e.g., PDSCH) are to be preempted. Additionally or alternatively, it may be determined that the use of uplink resources (e.g., time and/or frequency resources, antenna beam resources, etc.) corresponding a first SPS parameter configuration allocated to the one or more UEs for an uplink channel (e.g., PUSCH) are to be cancelled. Such disruption may, for example, be initiated from time to time in order to utilize those resources for other (e.g., higher priority) communications (e.g., URLLC).

At block 302 of flow 300, the base station may indicate, to the one or more UEs, implementation of alternative resources corresponding to one or more alternative SPS parameters. For example, the base station may indicate, to the one or more UEs, implementation of alternative downlink and/or uplink resources corresponding to one or more alternative SPS parameters. In accordance with some aspects of the disclosure, logic of base station 105 (e.g., alternative SPS parameter control code or instructions stored by memory 242 and executed by controller/processor 240) may initiate and control signaling (e.g., using transmit processor 220, TX MIMO processor 230, MODs 232a-232t, and/or antennas 234a-234t) an indication to inform the one or more UEs to implement alternative SPS parameters for use of alternative resources during the disruption. In an example, the indication may comprise a DI transmitted by base station 105 to one or more UEs 115 in communication therewith. In accordance with aspects of the disclosure, the base station may indicate implementation of alternative SPS parameters for implementing by the one or more UEs based at least in part on a DI transmitted by the base station to the one or more UEs.

In accordance with some aspects of the disclosure, the one or more alternative SPS parameters may comprise an alternative SPS parameter configuration stored by a respective UE of the one or more UEs in addition to a first SPS parameter configuration used by the respective UE as the first SPS parameters. For example, base station 105 may provide a plurality of SPS parameter configurations (e.g., from a SPS parameter database, as may be stored by memory 242) to UEs 115 (e.g., upon the UE joining wireless network 100, when establishing a connection with the UE, etc.). Additionally or alternatively, UEs 115 may be provided with a plurality of SPS parameter configurations other than by a base station that determines to disrupt use of resources by the UE (e.g., upon the UE being provisioned, upon the UE joining wireless network 100, etc.). Base station 105 may indicate the alternative SPS parameter configuration of the plurality of alternative SPS parameter configurations to be implemented by UEs 115, such as in a RRC configuration of a search space associated with GC-DCI that includes the DI. In some examples, a next SPS parameter configuration of an ordered list of SPS parameter configurations stored by the UE may be selected as the alternative SPS parameter configuration to be implemented based at least in part on the DI.

The one or more alternative SPS parameters may comprise changed one or more parameters of the first SPS parameters according to some aspects of the disclosure. For example, base station 105 may include a secondary set of SPS parameters (e.g., from a SPS parameter database, as may be stored by memory 242) when configuring UEs 115 (e.g., upon the UE joining wireless network 100, when establishing a connection with the UE, etc.) with a SPS parameter configuration for a particular channel, communication link, etc. Additionally or alternatively, UEs 115 may be provided with a secondary SPS parameters other than by a base station that determines to disrupt use of resources by the UE (e.g., upon the UE being provisioned, upon the UE joining wireless network 100, etc.). Parameters of the secondary set of SPS parameters may be activated as the alternative SPS parameter configuration at least in part by a DI.

A base station may provide information regarding an alternative SPS parameter configuration to be implemented by a UE, such as in or with a DI used to initiate disruption (e.g., preemption, cancellation, etc.) of resources. For example, base station 105 may indicate the alternative SPS parameter configuration in a RRC configuration of a search space associated with GC-DCI that includes the DI. The alternative SPS parameter configuration to be implemented may, for example, be indicated using an index value corresponding to the particular SPS parameters for implementation. Additionally or alternatively, SPS parameters of one or more alternative SPS parameters may be selected based on information included in the DI, such as a time resource, a frequency resource, or an antenna resource included in the DI. A base station may operate to select particular resources for preemption for causing one or more UEs to implement particular alternative SPS parameters.

Referring now to FIG. 4, flow 400 of the illustrated example shows operation by a UE according to an alternative SPS parameter implementation technique of some aspects of the present disclosure. At block 401 of flow 400, a UE may receive a DI transmitted by a base station. For example, UE 115 may receive (e.g., using antennas 252a-252r, DEMODs 254a-254r, MIMO detector 256, and/or receive processor 258) a DI transmitted by base station 105 in communication therewith. The DI may, for example, be transmitted by base station 105 to a plurality of UEs 115 in communication with the base station, such as a plurality of UEs sharing a channel (e.g., PDSCH) for which preemption of resources is being initiated. The DI may, for example, be transmitted by a base station to one or more UEs to preempt use of downlink resources corresponding to first SPS parameters with respect to the one or more UEs. As another example, the DI may be transmitted by base station 105 to a plurality of UEs 115 in communication with the base station, such as a plurality of UEs sharing a channel (e.g., PUSCH) for which cancellation of resources is being initiated. The DI may, for example, be transmitted by a base station to one or more UEs to cancel use of uplink resources corresponding to first SPS parameters with respect to the one or more UEs.

At block 402, the UE may implement alterative resources corresponding to one or more alternative SPS parameters. For example, logic of UE 115 (e.g., alternative SPS parameter control code or instructions stored by memory 282 and executed by controller/processor 280) may implement alternative downlink and/or uplink resources corresponding to one or more alternative SPS parameters for monitoring and/or transmitting based at least in part on the DI received from the base station. In accordance with some aspects of the disclosure, a first alternative SPS parameter configuration may be implemented by the UE and a second alternative SPS parameter configuration implemented by another UE of the one or more UEs. The first SPS parameter configuration may, for example, be different than the second SPS parameter configuration.

In accordance with some aspects of the disclosure, the one or more alternative SPS parameters may comprise an alternative SPS parameter configuration stored (e.g., using a SPS parameter database, as may be stored by memory 282) by the UE in addition to a first SPS parameter configuration used by the respective UE as the first SPS parameters. UE 115 may, for example, be provided with a plurality of SPS parameter configurations (e.g., an ordered or indexed list of SPS parameter configurations) for use according to an alternative SPS parameter implementation technique of some aspects of the present disclosure. In some examples, UE 115 may be provided such SPS parameters when being provisioned, upon joining a network, when establishing a connection with base stations 105, etc. Additionally or alternatively, UE 115 may obtain a secondary set of SPS parameters (e.g., stored by memory 282 using a SPS parameter database) when configured (e.g., upon the UE joining wireless network 100, when establishing a connection with the UE, etc.) with a SPS parameter configuration for a particular channel, communication link, etc. Parameters of the secondary set of SPS parameters may be implemented to change one or more parameters of the first SPS parameters and provide an alternative SPS parameter configuration.

An alternative SPS parameter configuration of the plurality of alternative SPS parameter configurations to be implemented by a UE may be determined at least in part based on the DI. For example, logic of UE 115 (e.g., alternative SPS parameter control code or instructions stored by memory 282 and executed by controller/processor 280) may analyze the content of the DI to determine an alternative SPS parameter configuration to implement. In some examples, one or more alternative SPS parameters are selected based at least in part on a time resource, a frequency resource, or an antenna beam included in the DI. Additionally or alternatively information provided in association with the DI may be utilized for determining alternative SPS parameters to be implemented by a UE. For example, logic of UE 115 (e.g., alternative SPS parameter control code or instructions stored by memory 282 and executed by controller/processor 280) may analyze a RRC configuration of a search space associated with GC-DCI that includes the DI to determine an alternative SPS parameter configuration to implement. In some examples, a next SPS parameter configuration of an ordered list of SPS parameter configurations stored by the UE may be selected as the alternative SPS parameter configuration to be implemented based at least in part on the DI.

Implementation of alternative SPS parameters by a UE based upon a DI may be conditioned upon various considerations according to some aspects of the disclosure. For example, logic of UE 115 (e.g., alternative SPS parameter control code or instructions stored by memory 282 and executed by controller/processor 280) may analyze information regarding the disruption of resources (e.g., a length of disruption of the first SPS parameters, an amount of time implementation of SPS parameters of the one or more alternative SPS parameters would overlap a first SPS parameter configuration, etc., or combinations thereof) to determine if alternative resources corresponding to one or more alternative SPS parameters are to be implemented. Additionally or alternatively, logic of UE 115 (e.g., alternative SPS parameter control code or instructions stored by memory 282 and executed by controller/processor 280) may analyze contained in the DI or associated therewith (e.g., a time resource, a frequency resource, or an antenna resource included in the DI) to determine if alternative resources corresponding to one or more alternative SPS parameters are to be implemented.

In accordance with some aspects of the disclosure, a length or duration of implementation of alternative SPS parameters may be based on various factors. For example, logic of UE 115 (e.g., alternative SPS parameter control code or instructions stored by memory 282 and executed by controller/processor 280) may analyze information contained in a DI and/or regarding the disruption of resources (e.g., a timing of the DI, a time resource of the first SPS parameters indicated by the DI as being interrupted by disruption, etc., or combinations thereof) to determine a duration during which an alternative SPS parameter configuration is to be implemented. Additionally or alternatively, logic of UE 115 (e.g., alternative SPS parameter control code or instructions stored by memory 282 and executed by controller/processor 280) may use information, configuration settings, etc. (e.g., an alternative SPS time value stored by the UE, such as using a SPS parameter database, as may be stored by memory 282) to determine a duration during which an alternative SPS parameter configuration is to be implemented.

Figure 5:
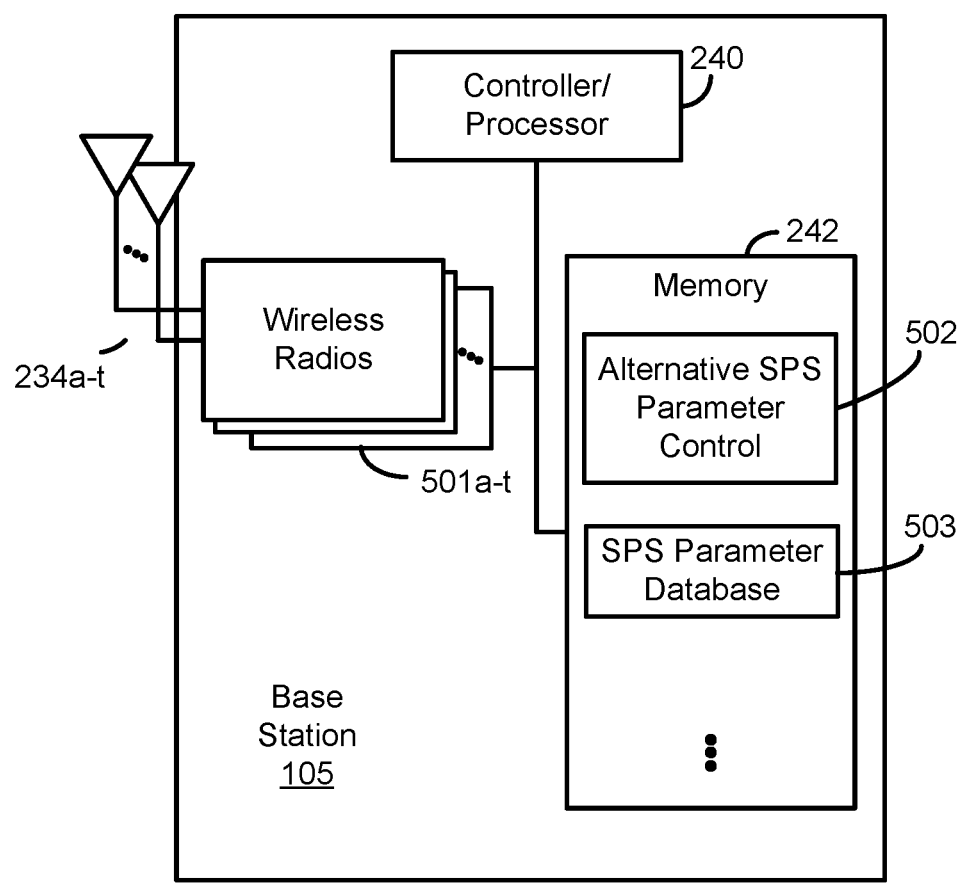
FIG. 5 is a block diagram conceptually illustrating a design of a base station configured to perform an alternative SPS parameter implementation technique according to some embodiments of the present disclosure.

FIG. 5 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 501a-t and antennas 234a-t. Wireless radios 501a-t include various components and hardware, as illustrated in FIG. 2 for base station 105, including modulator/demodulators 232a-t, MIMO detector 236, receive processor 238, transmit processor 220, and TX MIMO processor 230.

One or more algorithms stored by the memory 242 configure processor/controller 240, transmit processor 220, and/or receive processor 238 to carry out one or more procedures relating to wireless communication by base station 105, as previously described. For example, alternative SPS parameter control logic 502 and SPS parameter database 503 may be stored in memory 242 to enable and provide for alternative SPS parameter implementation in association with disruption of use of resources corresponding to other SPS parameters according to some aspects of the disclosure. Functions of flow 300 described above may, for example, be implemented by base station 105 using alternative SPS parameter control logic 502 and SPS parameter database 503.

Figure 6:
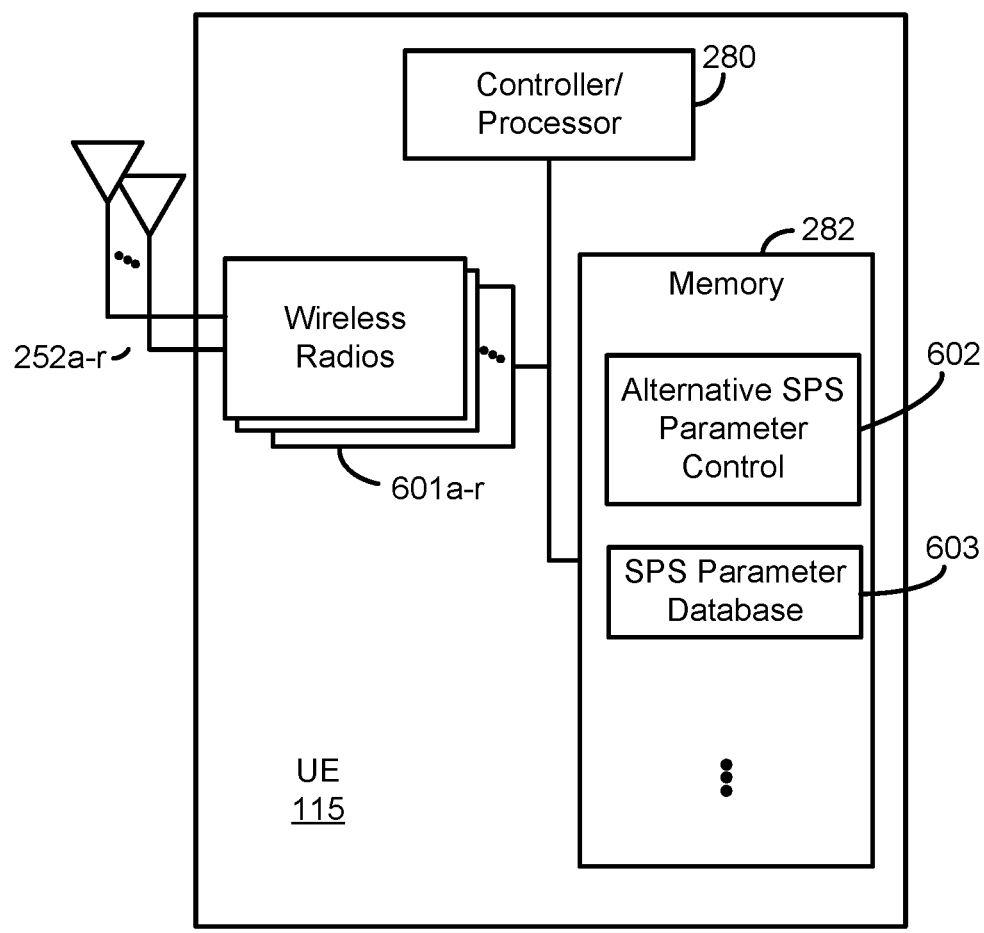
FIG. 6 is a block diagram conceptually illustrating a design of a UE configured to perform an alternative SPS parameter implementation technique according to some embodiments of the present disclosure.

FIG. 6 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 601a-r and antennas 252a-r. Wireless radios 601a-r include various components and hardware, as illustrated in FIG. 2 for UE 115, including modulator/demodulators 254a-r, MIMO detector 256, receive processor 258, transmit processor 264, and TX MIMO processor 266.

One or more algorithms stored by the memory 282 configure processor/controller 280, transmit processor 264, and/or receive processor 258 to carry out one or more procedures relating to wireless communication by UE 115, as previously described. For example, alternative SPS parameter control logic 602 and SPS parameter database 603 may be stored in memory 282 to enable and provide for alternative SPS parameter implementation in association with disruption of use of resources corresponding to other SPS parameters according to some aspects of the disclosure. Functions of flow 400 described above may, for example, be implemented by UE 115 using alternative SPS parameter control logic 602 and SPS parameter database 603.

The foregoing example configurations of base station 105 and UE 115 may operate to assign alternative resources for use where disruption (e.g., preemption, cancellation, etc.) of resources is initiated. Operation of such example configurations may avoid excessive signaling overhead for implementing alternative SPS parameters using a DI inform (e.g., implicitly) UEs to utilize alternative resources corresponding to alternative SPS parameters available to the UEs. Such configurations may be utilized to improve reliability and coverage with respect to UEs affected by disruption of resources, such as UEs implementing eMBB communications.

In some examples of methods, apparatuses, and articles described herein, various aspects of multi-slot transport block techniques may be implemented according to a multiplicity of combinations consistent with concepts described herein. Non-limiting examples of combinations of some aspects of a multi-slot transport block technique are set forth in the example clauses below.

1. Methods, apparatuses, and articles for wireless communication may provide for determining, by a base station, to disrupt use of resources corresponding to first SPS parameters with respect to one or more UEs in communication with the base station, and indicating, by the base station to the one or more UEs, implementation of alternative resources corresponding to one or more alternative SPS parameters for utilization by the one or more UEs based at least in part on a DI transmitted by the base station to the one or more UEs.

2. The methods, apparatuses, and articles of clause 1, wherein disruption of the use of resources corresponding to the first SPS parameters comprises preempting use of downlink resources corresponding to the first SPS parameters with respect to the one or more UEs, cancelling use of uplink resources corresponding to the first SPS parameters with respect to the one or more UEs, or a combination thereof, and wherein the DI comprises a PI, a CI, or a combination thereof.

3. The methods, apparatuses, and articles of any of clauses 1-2, wherein the DI indicates preemption of downlink transmission on a set of time and frequency resources.

4. The methods, apparatuses, and articles of any of clauses 1-3, wherein the DI indicates cancellation of uplink transmission on a set of time and frequency resources.

5. The methods, apparatuses, and articles of any of clauses 1-4, wherein the DI indicates disruption of transmission on a set of time and frequency resources for URLLC transmission.

6. The methods, apparatuses, and articles of any of clauses 1-5, wherein the one or more alternative SPS parameters comprise an alternative SPS parameter configuration stored by a respective UE of the one or more UEs in addition to a first SPS parameter configuration used by the respective UE as the first SPS parameters.

7. The methods, apparatuses, and articles of clause 6, further providing for indicating the alternative SPS parameter configuration in a RRC configuration of a search space associated with GC-DCI that includes the DI.

8. The methods, apparatuses, and articles of clause 6, wherein the DI indicates that the respective UE is to select the alternative SPS parameter configuration based upon a next SPS parameter configuration of an ordered list of SPS parameter configurations stored by the respective UE.

9. The methods, apparatuses, and articles of any of clauses 1-5, wherein the one or more alternative SPS parameters comprise changed one or more parameters of the first SPS parameters.

10. The methods, apparatuses, and articles of clause 9, wherein the changed one or more parameters of the first SPS parameters comprise a secondary set of SPS parameters included with the first SPS parameters when a UE of the one or more UEs was configured with the first SPS parameters.

11. The methods, apparatuses, and articles of any of clauses 1-10, wherein a duration of the implementation of the alternative resources corresponding to the one or more alternative SPS parameters is based at least in part on a timing of the DI, a time resource of the first SPS parameters indicated by the DI as being interrupted by disruption, or a combination thereof.

12. The methods, apparatuses, and articles of any of clauses 1-11, wherein a duration of the implementation of the alternative resources corresponding to the one or more alternative SPS parameters is based at least in part on an alternative SPS time value stored by a respective UE of the one or more UEs.

13. The methods, apparatuses, and articles of any of clauses 1-12, wherein the implementation of the alternative resources corresponding to the one or more alternative SPS parameters is based at least in part on a length of disruption of the first SPS parameters, an amount of time implementation of SPS parameters of the one or more alternative SPS parameters would overlap a first SPS parameter configuration, or a combination thereof.

14. The methods, apparatuses, and articles of any of clauses 1-13, wherein the implementation of the alternative resources corresponding to the one or more alternative SPS parameters is based at least in part on content of the DI.

15. The methods, apparatuses, and articles of clause 14, wherein SPS parameters of the one or more alternative SPS parameters are selected based at least in part on a time resource, a frequency resource, or an antenna beam included in the DI.

16. The methods, apparatuses, and articles of any of clauses 1-15, wherein the one or more alternative SPS parameters comprises a first alternative SPS parameter configuration implemented by a first UE of the one or more UEs and a second alternative SPS parameter configuration implemented by a second UE of the one or more UEs, wherein the first SPS parameter configuration is different than the second SPS parameter configuration.

17. The methods, apparatuses, and articles of any of clauses 1-16, wherein the one or more UEs comprise UEs implementing enhanced mobile broadband (eMBB) communications, and wherein the one or more alternative SPS parameters are configured to mitigate degradation of at least one of reliability or coverage of the eMBB communications.

18. Methods, apparatuses, and articles for wireless communication may provide for receiving, by a UE, a DI transmitted by a base station to one or more UEs to disrupt utilization of resources corresponding to first SPS parameters with respect to the one or more UEs, and implementing, by the UE, alterative resources corresponding to one or more alternative SPS parameters for utilization based at least in part on the DI received from the base station.

19. The methods, apparatuses, and articles of clause 18, wherein the DI indicates preemption of downlink transmission to the UE on a set of time and frequency resources.

20. The methods, apparatuses, and articles of any of clauses 18-19, wherein the DI indicates cancellation of uplink transmission on a set of time and frequency resources.

21. The methods, apparatuses, and articles of any of clauses 18-20, wherein the DI indicates transmission on a set of time and frequency resources for URLLC transmission.

22. The methods, apparatuses, and articles of any of clauses 18-21, wherein the one or more alternative SPS parameters comprise an alternative SPS parameter configuration stored by the UE in addition to a first SPS parameter configuration used by the respective UE as the first SPS parameters.

23. The methods, apparatuses, and articles of clause 22, further providing for determining the alternative SPS parameter configuration from a RRC configuration of a search space associated with GC-DCI that includes the DI.

24. The methods, apparatuses, and articles of clause 22, wherein the DI indicates that the UE is to select the alternative SPS parameter configuration based upon a next SPS parameter configuration of an ordered list of SPS parameter configurations stored by the respective UE.

25. The methods, apparatuses, and articles of any of clauses 18-21, wherein the one or more alternative SPS parameters comprise changed one or more parameters of the first SPS parameters.

26. The methods, apparatuses, and articles of clause 25, wherein the changed one or more parameters of the first SPS parameters comprise a secondary set of SPS parameters obtained with the first SPS parameters when the UE was configured with the first SPS parameters.

27. The methods, apparatuses, and articles of any of clauses 18-26, wherein a duration of the implementing the alternative resources corresponding to the one or more alternative SPS parameters is based at least in part on a timing of the DI, a time resource of the first SPS parameters indicated by the DI as being interrupted by disruption, or a combination thereof.

28. The methods, apparatuses, and articles of any of clauses 18-27, wherein a duration of the implementing the alternative resources corresponding to the one or more alternative SPS parameters is based at least in part on an alternative SPS time value stored by a respective UE of the one or more UEs.

29. The methods, apparatuses, and articles of any of clauses 18-28, wherein the implementing the alternative resources corresponding to the one or more alternative SPS parameters is based at least in part on a length of disruption of the first SPS parameters, an amount of time implementation of SPS parameters of the one or more alternative SPS parameters would overlap a first SPS parameter configuration, or a combination thereof.

30. The methods, apparatuses, and articles of any of clauses 18-29, wherein the implementing the alternative resources corresponding to the one or more alternative SPS parameters is based at least in part on content of the DI.

31. The methods, apparatuses, and articles of clause 30, wherein SPS parameters of the one or more alternative SPS parameters are selected based at least in part on a time resource, a frequency resource, or an antenna beam included in the DI.

32. The methods, apparatuses, and articles of any of clauses 18-31, wherein the one or more alternative SPS parameters comprise a first alternative SPS parameter configuration implemented by the UE and a second alternative SPS parameter configuration implemented by another UE of the one or more UEs, wherein the first SPS parameter configuration is different than the second SPS parameter configuration.

33. The methods, apparatuses, and articles of any of clauses 18-32, wherein the UE is implementing eMBB communications, and wherein the one or more alternative SPS parameters are configured to mitigate degradation of at least one of reliability or coverage of the eMBB communications.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof. In addition, features discussed herein relating to alternative SPS parameter implementation techniques may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 3 and 4) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   determining, by a base station, to disrupt use of resources corresponding to first semi-persistent scheduling (SPS) parameters with respect to one or more user equipments (UEs) in communication with the base station; and
   indicating, by the base station to the one or more UEs, implementation of alternative resources corresponding to one or more preconfigured alternative SPS parameters for utilization by the one or more UEs based at least in part on a disruption indication (DI) transmitted by the base station to the one or more UEs indicating activation of the one or more preconfigured alternative SPS parameters, wherein the one or more preconfigured alternative SPS parameters comprise an alternative SPS parameter configuration stored by a respective UE of the one or more UEs in addition to a first SPS parameter configuration used by the respective UE as the first SPS parameters.

2. The method of claim 1, wherein disruption of the use of resources corresponding to the first SPS parameters comprises preempting use of downlink resources corresponding to the first SPS parameters with respect to the one or more UEs, cancelling use of uplink resources corresponding to the first SPS parameters with respect to the one or more UEs, or a combination thereof, and wherein the DI comprises a preemption indication (PI), a cancellation indication (CI), or a combination thereof.

3. The method of claim 1, wherein the one or more preconfigured alternative SPS parameters comprise changed one or more parameters of the first SPS parameters.

4. The method of claim 1, wherein a duration of the implementation of the alternative resources corresponding to the one or more preconfigured alternative SPS parameters is based at least in part on a timing of the DI, a time resource of the first SPS parameters indicated by the DI as being interrupted by disruption, or a combination thereof.

5. The method of claim 1, wherein a duration of the implementation of the alternative resources corresponding to the one or more preconfigured alternative SPS parameters is based at least in part on an alternative SPS time value stored by a respective UE of the one or more UEs.

6. The method of claim 1, wherein the implementation of the alternative resources corresponding to the one or more preconfigured alternative SPS parameters is based at least in part on a length of disruption of the first SPS parameters, an amount of time implementation of SPS parameters of the one or more preconfigured alternative SPS parameters would overlap a first SPS parameter configuration, or a combination thereof.

7. The method of claim 1, wherein the implementation of the alternative resources corresponding to the one or more preconfigured alternative SPS parameters is based at least in part on content of the DI.

8. The method of claim 1, wherein the one or more preconfigured alternative SPS parameters comprises a first alternative SPS parameter configuration implemented by a first UE of the one or more UEs and a second alternative SPS parameter configuration implemented by a second UE of the one or more UEs, wherein the first alternative SPS parameter configuration is different than the second alternative SPS parameter configuration.

9. An apparatus configured for wireless communication, the apparatus comprising:
at least one processor; and
a memory coupled to the at least one processor, wherein the at least one processor is configured to:
determine, by a base station, to disrupt use of resources corresponding to first semi-persistent scheduling (SPS) parameters with respect to one or more user equipments (UEs) in communication with the base station; and
indicate, by the base station to the one or more UEs, implementation of alternative resources corresponding to one or more preconfigured alternative SPS parameters for utilization by the one or more UEs based at least in part on a disruption indication (DI) transmitted by the base station to the one or more UEs indicating activation of the one or more preconfigured alternative SPS parameters, wherein the one or more preconfigured alternative SPS parameters comprise an alternative SPS parameter configuration stored by a respective UE of the one or more UEs in addition to a first SPS parameter configuration used by the respective UE as the first SPS parameters.

10. The apparatus of claim 9, wherein a duration of implementation of the alternative resources corresponding to the one or more preconfigured alternative SPS parameters is based at least in part on a timing of the DI, a time resource of the first SPS parameters indicated by the DI as being interrupted by disruption, or a combination thereof.

11. The apparatus of claim 9, wherein a duration of implementation of the alternative resources corresponding to the one or more preconfigured alternative SPS parameters is based at least in part on an alternative SPS time value stored by a respective UE of the one or more UEs.

12. The apparatus of claim 9, wherein implementation of the alternative resources corresponding to the one or more preconfigured alternative SPS parameters is based at least in part on a length of preemption of the first SPS parameters, an amount of time implementation of SPS parameters of the one or more preconfigured alternative SPS parameters would overlap a first SPS parameter configuration, or a combination thereof.

13. The apparatus of claim 9, wherein implementation of the alternative resources corresponding to the one or more preconfigured alternative SPS parameters is based at least in part on content of the DI.

14. The apparatus of claim 9, wherein the one or more preconfigured alternative SPS parameters comprises a first alternative SPS parameter configuration implemented by a first UE of the one or more UEs and a second alternative SPS parameter configuration implemented by a second UE of the one or more UEs, wherein the first alternative SPS parameter configuration is different than the second alternative SPS parameter configuration.

15. A method of wireless communication, comprising:
receiving, by a user equipment (UE), a disruption indication (DI) transmitted by a base station to one or more UEs to disrupt utilization of resources corresponding to first semi-persistent scheduling (SPS) parameters with respect to the one or more UEs; and
implementing, by the UE, alternative resources corresponding to one or more preconfigured alternative SPS parameters for utilization based at least in part on the DI received from the base station indicating activation of the one or more preconfigured alternative SPS parameters, wherein the one or more preconfigured alternative SPS parameters comprise an alternative SPS parameter configuration stored by the UE in addition to a first SPS parameter configuration used by the UE as the first SPS parameters.

16. The method of claim 15, wherein disruption of the use of resources corresponding to the first SPS parameters comprises preempting use of downlink resources corresponding to the first SPS parameters with respect to the one or more UEs, cancelling use of uplink resources corresponding to the first SPS parameters with respect to the one or more UEs, or a combination thereof, and wherein the DI comprises a preemption indication (PI), a cancellation indication (CI), or a combination thereof.

17. The method of claim 15, wherein the one or more preconfigured alternative SPS parameters comprise changed one or more parameters of the first SPS parameters.

18. The method of claim 15, wherein a duration of the implementing the alternative resources corresponding to the one or more preconfigured alternative SPS parameters is based at least in part on a timing of the DI, a time resource of the first SPS parameters indicated by the DI as being interrupted by disruption, or a combination thereof.

19. The method of claim 15, wherein a duration of the implementing the alternative resources corresponding to the one or more preconfigured alternative SPS parameters is based at least in part on an alternative SPS time value stored by a respective UE of the one or more UEs.

20. The method of claim 15, wherein the implementing the alternative resources corresponding to the one or more preconfigured alternative SPS parameters is based at least in part on a length of disruption of the first SPS parameters, an amount of time implementation of SPS parameters of the one or more preconfigured alternative SPS parameters would overlap a first SPS parameter configuration, or a combination thereof.

21. The method of claim 15, wherein the implementing the alternative resources corresponding to the one or more preconfigured alternative SPS parameters is based at least in part on content of the DI.

22. The method of claim 15, wherein the one or more preconfigured alternative SPS parameters comprise a first alternative SPS parameter configuration implemented by the UE and a second alternative SPS parameter configuration implemented by another UE of the one or more UEs, wherein the first alternative SPS parameter configuration is different than the second alternative SPS parameter configuration.

23. An apparatus configured for wireless communication, the apparatus comprising:
at least one processor; and
a memory coupled to the at least one processor, wherein the at least one processor is configured to:
receive, by a user equipment (UE), a disruption indication (DI) transmitted by a base station to one or more UEs to disrupt utilization of resources corresponding to first semi-persistent scheduling (SPS) parameters with respect to the one or more UEs; and
implement, by the UE, alternative resources corresponding to one or more preconfigured alternative SPS parameters for utilization based at least in part on the DI received from the base station indicating activation of the one or more preconfigured alternative SPS parameters, wherein the one or more preconfigured alternative SPS parameters comprise an alternative SPS parameter configuration stored by the UE in addition to a first SPS parameter configuration used by the UE as the first SPS parameters.

24. The apparatus of claim 23, wherein a duration of implementing the alternative resources corresponding to the one or more preconfigured alternative SPS parameters is based at least in part on a timing of the DI, a time resource of the first SPS parameters indicated by the DI as being interrupted by disruption, or a combination thereof.

25. The apparatus of claim 23, wherein a duration of implementing the alternative resources corresponding to the one or more preconfigured alternative SPS parameters is based at least in part on an alternative SPS time value stored by a respective UE of the one or more UEs.

26. The apparatus of claim 23, wherein implementing the alternative resources corresponding to the one or more preconfigured alternative SPS parameters is based at least in part on a length of preemption of the first SPS parameters, an amount of time implementation of SPS parameters of the one or more preconfigured alternative SPS parameters would overlap a first SPS parameter configuration, or a combination thereof.

27. The apparatus of claim 23, wherein implementing the alternative resources corresponding to the one or more preconfigured alternative SPS parameters is based at least in part on content of the DI.

28. The apparatus of claim 23, wherein the one or more preconfigured alternative SPS parameters comprise a first alternative SPS parameter configuration implemented by the UE and a second alternative SPS parameter configuration implemented by another UE of the one or more UEs, wherein the first alternative SPS parameter configuration is different than the second alternative SPS parameter configuration.

* * * * *